United States Patent
Johnson et al.

(10) Patent No.: US 6,684,395 B2
(45) Date of Patent: Jan. 27, 2004

(54) MULTIPLE IMAGE DYNAMIC BIND AND LOAD PROCEDURE FOR A MULTI-PROCESSOR

(75) Inventors: Desmond R. Johnson, Rutland, MA (US); Donald F. Hooper, Shrewsbury, MA (US); James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 438 days.

(21) Appl. No.: 09/753,084

(22) Filed: Dec. 28, 2000

(65) Prior Publication Data

US 2003/0046358 A1 Mar. 6, 2003

(51) Int. Cl.[7] .................................................. G06F 9/44
(52) U.S. Cl. ........................ 717/162; 717/121; 717/122; 717/164; 717/170
(58) Field of Search ................................ 717/162–167, 717/121–122, 170

(56) References Cited

U.S. PATENT DOCUMENTS 5,452,461 A  *  9/1995  Umekita et al. ............ 717/149
5,745,058 A  *  4/1998  Auerbach et al. ............. 341/51
5,748,963 A  *  5/1998  Orr ............................. 717/131
6,230,312 B1 *  5/2001  Hunt ........................... 717/108

FOREIGN PATENT DOCUMENTS

GB       2 319 366 A  *  5/1998  ............. G06F/9/45

OTHER PUBLICATIONS

IBM Technical Disclosure Bulletin, "Retrofix: Creating Fix Control Statements for Monolithic Program Objects", vol. 37, No. 3, pp.: 449–450, Mar. 1994.*

* cited by examiner

Primary Examiner—Tuan Dam
Assistant Examiner—Ted T. Vo
(74) Attorney, Agent, or Firm—Fish & Richardson P.C.

(57) ABSTRACT

A method and mechanism for executing an application by a processor in a multi-processor configuration of processors, each having an associated instruction memory is presented. The application receives object code that includes an image for at least one other processor in the multi-processor configuration of processors. The application binds an import variable in the image to a parameter value and stores the image for the at least one other processor into the associated instruction memory.

15 Claims, 7 Drawing Sheets

MULTIPLE IMAGE DYNAMIC BIND AND LOAD PROCEDURE FOR A MULTI-PROCESSOR

CROSS REFERENCE TO RELATED APPLICATIONS

This application is related to the following U.S. patent applications:

U.S. patent application Ser. No. 09/387,111, entitled, "Parallel Processor Architecture," filed Aug. 31, 1999; and U.S. patent application entitled, "Thread Signaling in Multi-Threaded Network Processor," filed Dec. 28, 1999.

BACKGROUND OF THE INVENTION

This invention relates generally to multi-processing systems.

In conventional multi-processor systems in which processor chips or modules are configured for parallel processing, microcode for the processors is developed on a development station and downloaded from the development station to each of the processors separately. Additionally, in some prior processor architectures, a processor having microcode in internal memory is capable of modifying its own instruction stream as it executes.

In multi-processing applications made up of different programs, certain parameters to be used in the execution of those programs may not be known at compile time. There are various known techniques for resolving parameter values. One approach uses dynamic linked libraries (linked at run time) to bind variables. Another approach commonly used for two programs executing on the same processor involves delayed binding of variables. In this second approach, one of the programs has a pointer to a parameter having an un-initialized value. The second program has a symbol table containing the parameter name and the pointer to the parameter. The second program determines the actual value of the parameter, performs a symbol table look-up to determine the location of the parameter and modifies the value of the parameter at that location for use by the first program. Yet another mechanism is the static linker. The static linker enables a program run on one processor to calculate values of variables to be used in a second program run on another processor and insert those values directly into the instructions of the second program as part of linking compiled sections of code for the second program.

BRIEF DESCRIPTION OF THE DRAWINGS

Other features and advantages of the invention will be apparent from the following description taken together with the drawings in which.

DETAILED DESCRIPTION

Figure 1:
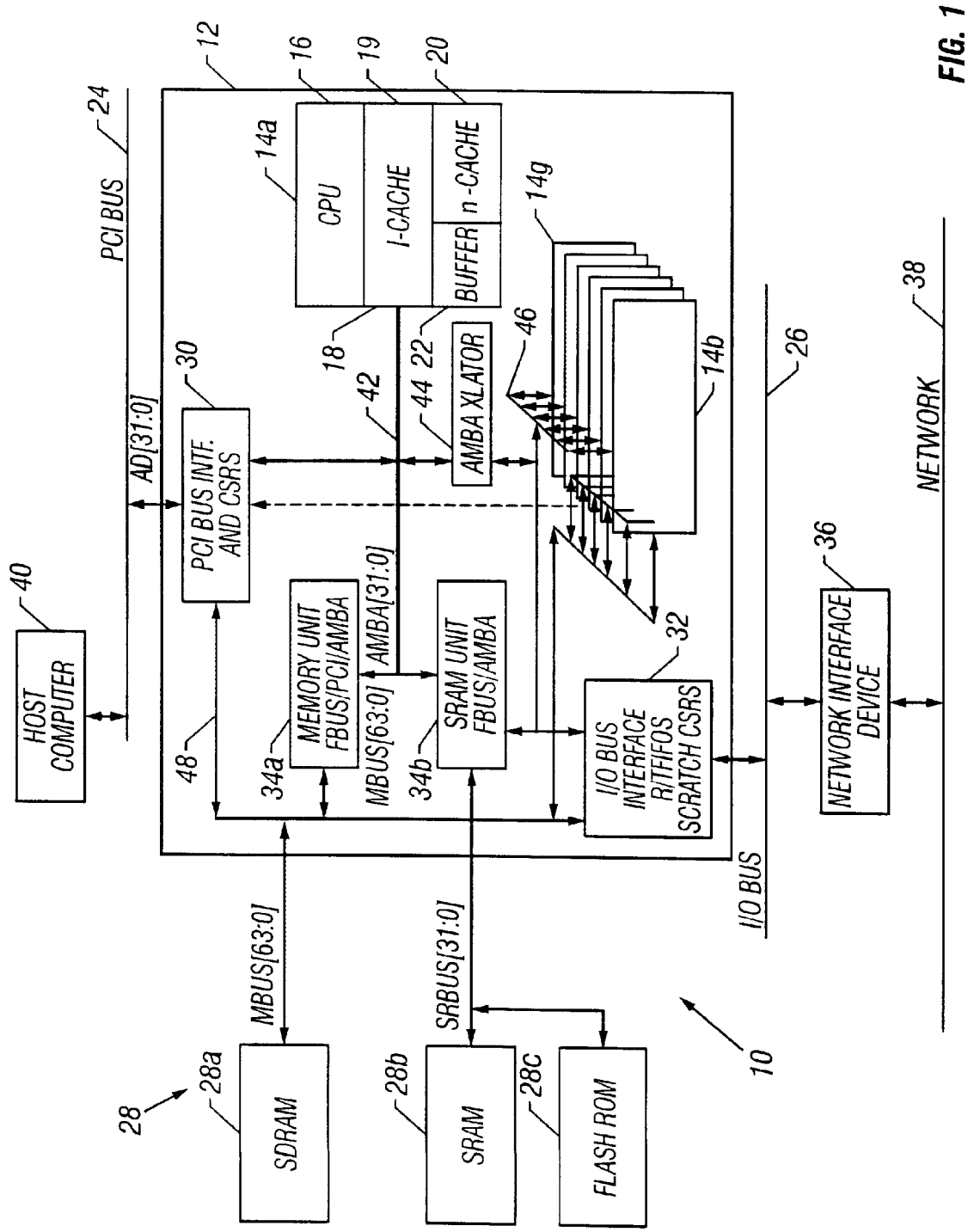
FIG. 1 is a block diagram of a system employing a multi-processor having a general-purpose processor and a plurality of microengines.

Referring to FIG. 1, a system 10 includes a processor 12 that is configured as a multi-processor 12. That is, the processor 12 includes a plurality of processors 14a through 14g. In the embodiment shown, the processor 14a is a general-purpose processor and processors 14b–14g are microcoded processors (hereinafter, microengines 14b–16g), each with multiple hardware controlled threads that can be simultaneously active and independently work on a task. In the embodiment shown, there are six microengines; however, a different number of microengines could be used. Each of the six microengines 14b–16g is capable of processing multiple execution threads.

The processor 14a performs general-purpose computer type functions such as handling protocols, exceptions, extra support for microengine processing when a more detailed processing is needed. In one embodiment, the processor 14a is a StrongARM (ARM is a trademark of ARM Limited, United Kingdom) core based architecture. The processor 14a (hereinafter, "the core processor" 14a) includes an internal CPU 16 coupled to an internal core memory 17 that includes an instruction memory (shown as an instruction cache) 18, a data memory (shown as a data cache) 20 and read/write buffers 22.

The multi-processor 12 is coupled to a first peripheral bus (shown as a PCI bus) 24, a second peripheral bus referred to as an I/O bus 26 and a memory system 28. The processors 14a–14g operate with shared resources including the memory system 28, a PCI bus interface 30 and an I/O bus interface 32. The PCI bus interface 30 provides an interface to the PCI bus 24. The I/O bus interface 32 is responsible for controlling and interfacing the processor 12 to the I/O bus 26. The memory system 28 includes a Synchronous Dynamic Random Access Memory (SDRAM) 28a, which is accessed via an SDRAM controller 34a, a Static Random Access Memory (SRAM) 28b, which is accessed using an SRAM controller 34b, and a nonvolatile memory (shown as a FlashROM) 28c that is used for boot operations and also accessed using the SRAM controller 34b. The SDRAM 34a and SDRAM controller 34b are typically used for processing large volumes of data, e.g., in a network application, processing of payloads from network packets. The SRAM 28b and SRAM controller 34b are used in a for low latency, fast access tasks, e.g., accessing look-up tables, memory for the processor 14a, and so forth. The processors 14 can execute memory reference instructions to either the SDRAM controller 34a or the SRAM controller 34b.

The multi-processor processor 12 interfaces to at least one I/O device 36 over the I/O Bus 26. In the embodiment shown, the I/O device 36 is a network interface device that couples the multiprocessor 12 to a network 38. The device 36 may include a plurality of ports to be serviced by the multiprocessor 12. Other devices, such as a host computer 40, which is coupled to the PCI bus 24, are also serviced by the multi-processor 12.

Each of the functional units of the processor 12 are coupled to one or more internal buses. The internal buses include an internal core bus 42 (labeled "AMBA") for coupling the processor 14a to the memory controllers 34a, 34b and to an AMBA translator 44. The processor 12 also includes a private bus 46 that couples the microengines 14b–14g to the SRAM controller 34b, AMBA translator 44 and the I/O bus interface 32. A memory bus 48 couples the memory controllers 34a, 34b to the bus interfaces 30, 32 and the memory system 28.

Figure 2:
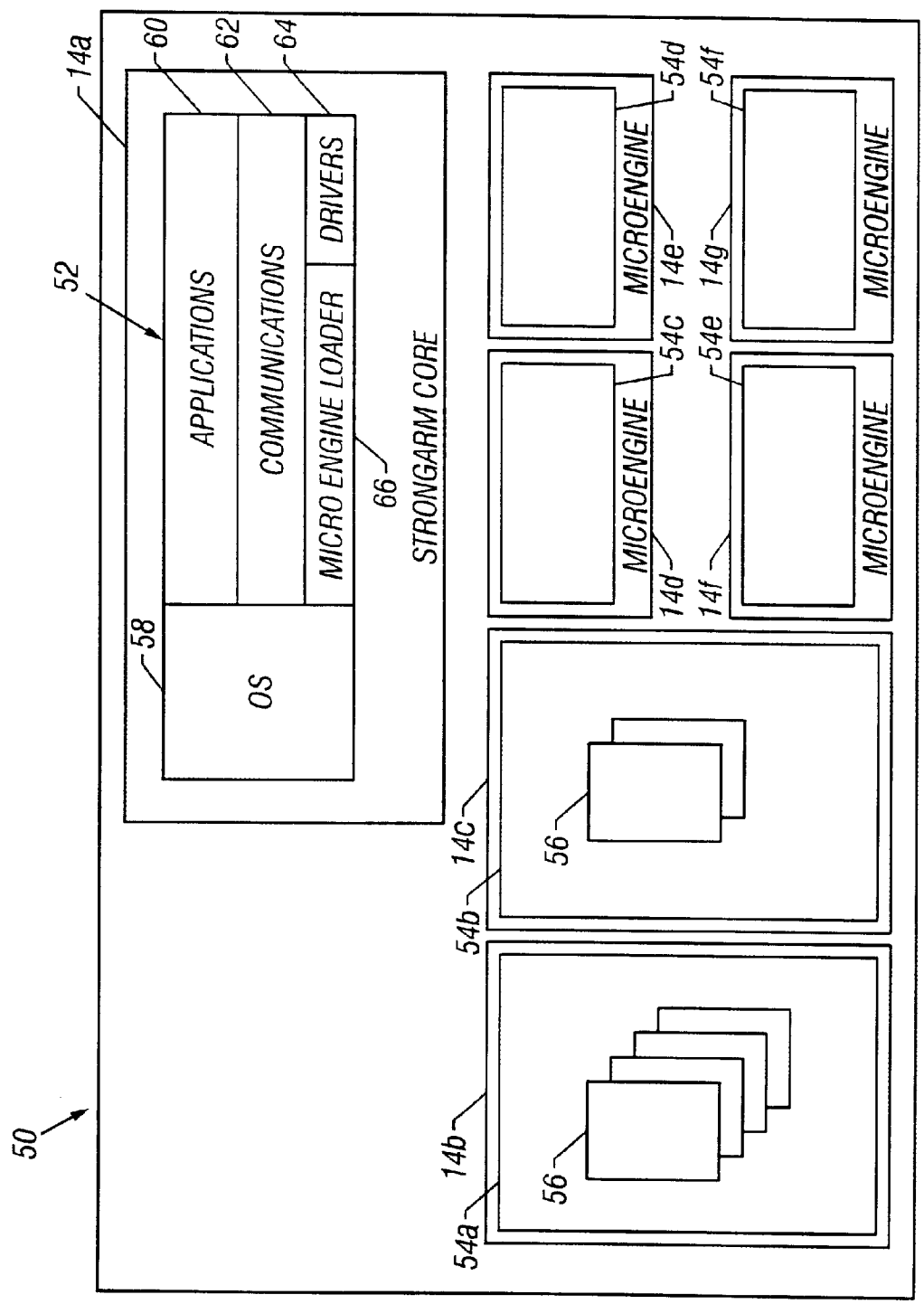
FIG. 2 is a block diagram of software executed by the multiprocessor.

Referring to FIG. 2, a high-level view of multi-processor software 50 that executes on the multi-processor 12 is depicted. The software 50 includes core processor software 52 that executes on the core processor 14a and microengine microprograms (or microcode) 54a–54f that executes on the respective microengines 14b–14g. As illustrated with reference to the microcodes 54a and 54b, the microcode in each of the microengines can comprise multiple threads of execution, threads 56. The core processor software 52 includes an operating system 58 through which the core processor 14a can call functions to operate on the microengines 14b–14g. The core processor 14a can use any supported operating system, preferably a real-time operating system. For the core processor implemented as a StrongARM architecture, operating systems such as MicrosoftNT real-time, VXWorks and uCOS, a freeware operating system available over the Internet, can be used. The core processor software 52 further includes application software 60, communications software 62 and device drivers 64, which includes a device driver for the microengines 14b–14g. The software 52 further includes a microengine loader 66 to load the microcode 54a–54g into respective ones of the microengines 14b–14g, as will be described more fully below.

Figure 3:
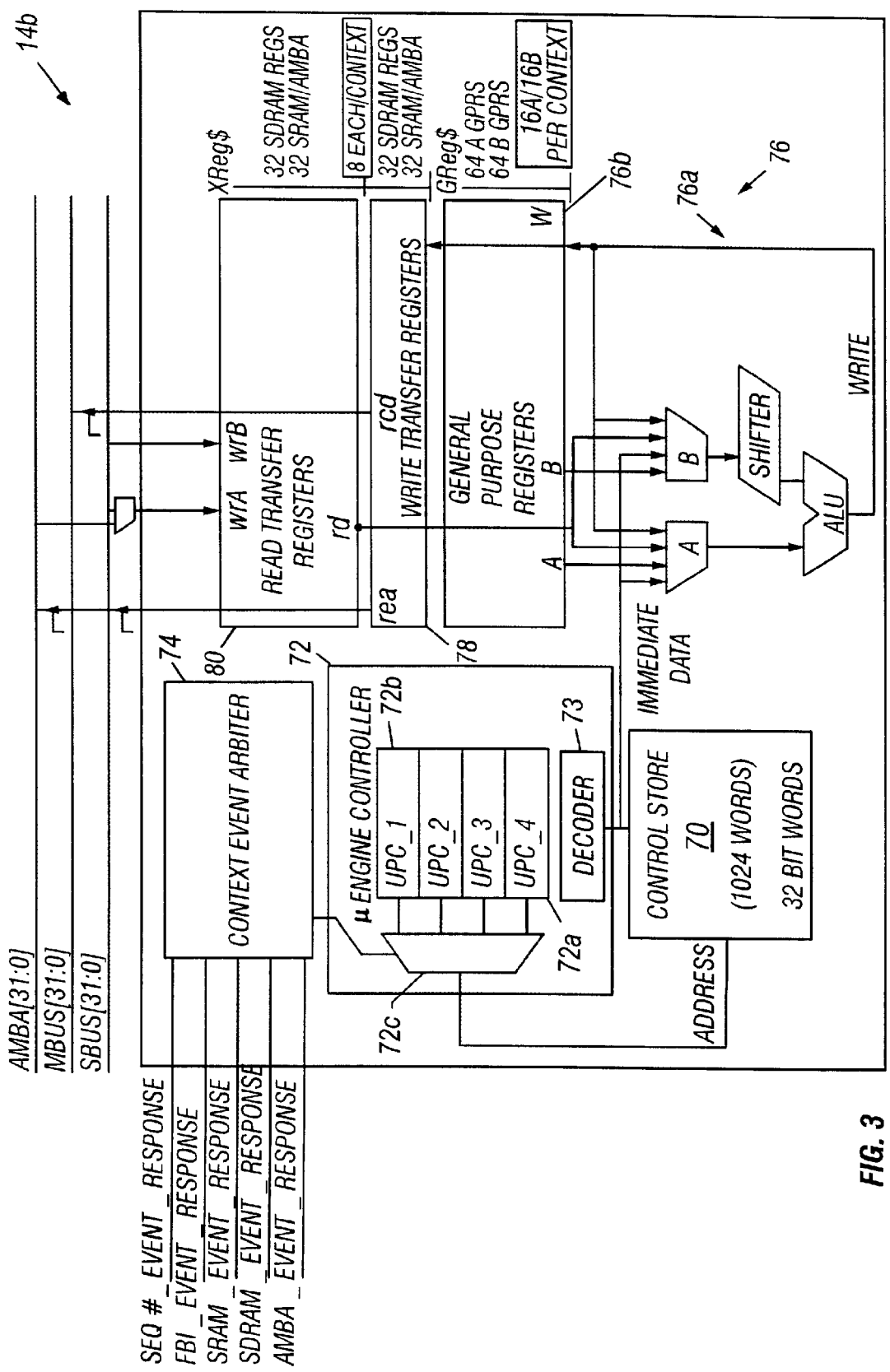
FIG. 3 is a block diagram of the microengine employed in the multi-processor of FIG. 1.

Referring to FIG. 3, an exemplary one of the microengines 14b–14f, the microengine 14b, is shown. The microengine 14b includes an instruction memory (or "control store") 70 for storing microinstructions of a corresponding one of the microcodes 54, the microcode 54a. The microcode 54a is loadable by the core processor 14a (from FIG. 1), as will be described more fully below. The microengine 14b also includes control logic 72. The control logic 72 includes an instruction decoder 73 and program counter units 72a–72d. The four program counters are maintained in hardware. The microengine 14b also includes context event switching logic 74. The context event switching logic 74 receives messages from each one of the share resources, e.g., SRAM 28b, SDRAM 28a, or processor core 14a, control and status registers, and so forth. These messages provide information on whether a requested function has completed. Based on whether or not the function requested by a thread has completed and signaled completion, the thread needs to wait for that complete signal, and if the thread is enabled to operate, then the thread is place on an available thread list (not shown). As was illustrated in FIG. 2, the microengine 14b can have multiple threads of execution available.

The microengine 14b also includes an execution box (EBOX) data path 76 that includes an arithmetic logic unit (ALU) 76a and a general purpose register (GPR) set 76b. The ALU 76a performs arithmetic and logical functions as well as shift functions.

The microengine 14ba further includes a write transfer register file 78 and a read transfer register file 80. The write transfer register file 78 stores data to be written to a resource. The read transfer register file 80 is for storing return data from a resource. Subsequent to or concurrent with the data arrival, an event signal from the respective shared resource, e.g., memory controllers 34a, 34b, or core processor 14a, will be provided to the context event arbiter 74, which in turn alerts the thread that the data is available or has been sent. Both transfer register files 78, 80 are connected to the EBOX 76 through a data path. In the described implementation, each of the register files includes 64 registers.

The functionality of the microengine threads is determined by the microcode loaded (via the core processor 14a) for a particular user's application into each microengine's control store 70. For example, when the processor 12 is a network processor, one of the microengine threads may be assigned to serve as a receive scheduler thread and another as a transmit scheduler thread, and other threads on other microengines may be configured as receive processing threads and transmit processing (or "fill") threads. Other thread task assignments include a transmit arbiter and one or more core communication threads. Once launched, a thread performs its function independently.

Figure 4:
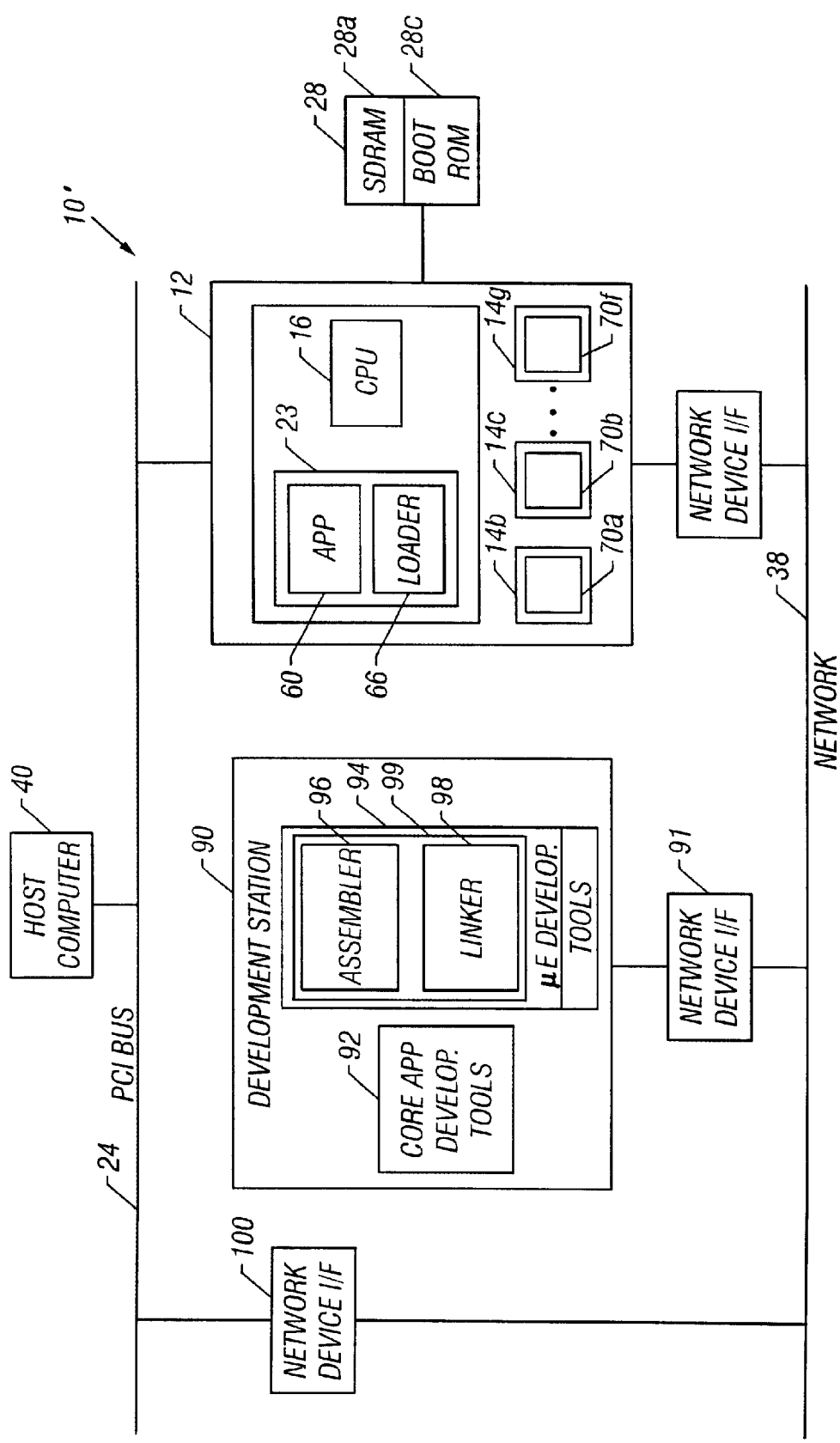
FIG. 4 is a block diagram of a code development system environment.

Referring to FIG. 4, another embodiment of the system 10 shown as a development system environment 10', includes a development station 90 connected to the network 38 by a second network interface device 91. The development station 90 is configured with core processor application software tools 92 for generating core processor application program or programs 60 (FIG. 2) and microengine microcode development tools 94 for generating the microcode 54. The microengine microcode development tools 94 include a microcode assembler 96 and a microcode linker 98, collectively, microcode development software 99. Although not shown, the development station 90 includes a Graphical User Interface (GUI) through which a user (i.e., a programmer or code developer) may enter commands and other input data, such as source code, and further includes any other software that would allow the development station to communicate over the network 38 with either the processor 12 or host computer like the PCI host computer 40. Communications from the network 38 to the PCI bus are supported by a third network interface device 100.

Referring to FIGS. 2 and 4, various software components of the environment—the operating system 58, the core processor application 60, the microengine loader 66, the development tools 90 and the communications software 62 in the core processor and the development system (not shown)—cooperate to enable the core processor 14b to configure the microengines 14b–14g for operation with appropriate user-defined functionality. A code object for the application software 60 for the core processor 14a is generated from user-defined source code entered using the development tools 92. Once generated, the application code object is provided to the boot memory 28c. At initialization time, the code object for the application 60 is loaded into either SDRAM 28a or internal core memory 18, or both, for execution. A single code object corresponding to all of the microcode 54 for the microengines 14b–14g is generated from user-defined source code entered using the development tools 94. Once generated, the code object may be stored in a file or buffer in storage (or host memory) and loaded into processor DRAM memory 28a by the application, or provided to the Flash memory 28c by the development station 90. Thus, there are a number of different ways to move the microcode object, once generated, into the memory 28 of the processor 12. The application 60 directs the loader 66 to load the microcode from the memory 28 into the control stores 70a–70f of microengines 14b–14g. The application may do so at any time. Typically, the application is defined to load the microcode 54 at initialization time. It may load the microcode 54 into only one or more (or all) of the microengines at the same time, or one at a time. The microcode 54 may be the same for all of the microengines 14b–14g, or it may be different for one or more of the microengines 14b–1g, depending on the functionality that the user wishes to assign to each of them (and their threads).

It is understood that the development station and its tools are only required when developing, modifying or debugging code. Although the development station is depicted as a network client, it could be a console connected to the processor 12 via a serial port connection (not shown).

Figure 5:
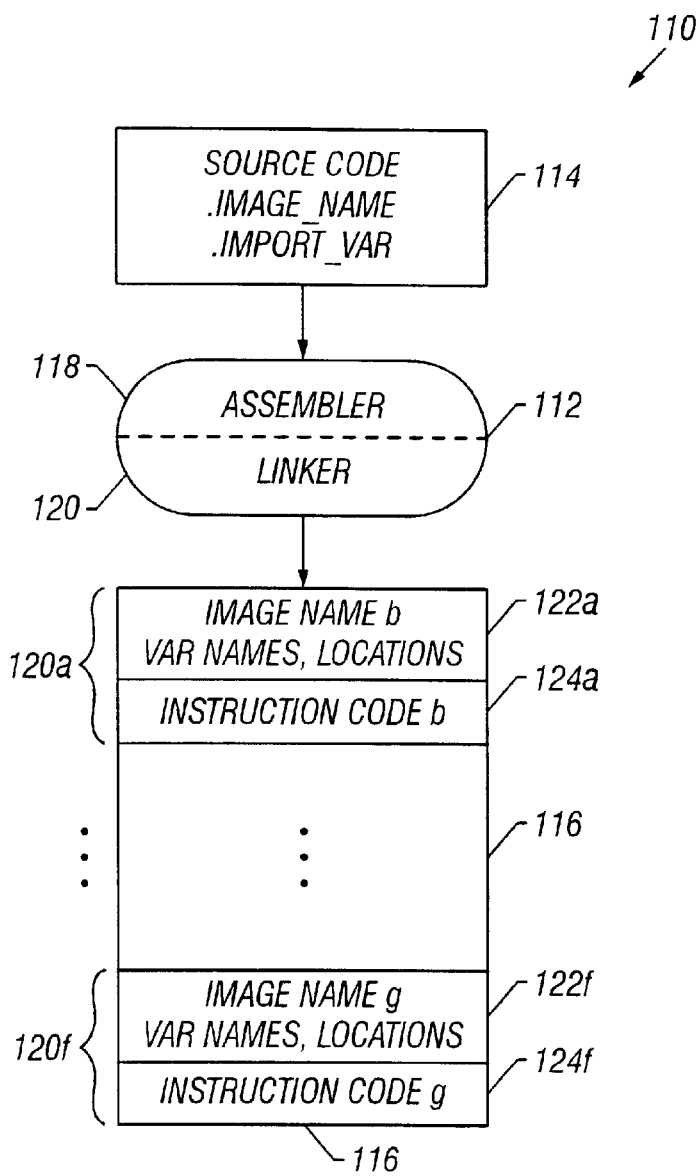
FIG. 5 is a depiction of a process of generating a microcode object.

FIG. 5 depicts a high-level view of the microcode development process 110, illustrating a process 112 corresponding to the microcode development software 90 and some of the details of user input 114 and process output 116. As shown, the user input is in the form of a source code. The process 112 includes an assembler process 118 and a linker process 120. The assembler process 118 produces a list file (*.list file) from the source code. The list file is provided to the linker process 120, which generates the process output 116 in the form of a code object 114. The microcode code object 116 includes a plurality of images 120a–120f, each one corresponding to a different one of the microengines 14b–14g.

Thus, a user provides the source code 114 to the assembler 118. Each section of the source code 114 identifies that it belongs to a given program image through an image name declaration. The code sections designated for different microengines have different image names. Image name definition associates a name with the content of the assembler *.list file in the output object file. That is, it identifies the image within the object file, thus allowing referencing to particular section of the object file by name by the loader 66. The image name is unique for all input files that are to be linked. The image name is defined in the microcode source file (*.uc) using a .image_name keyword. If the .image_name is not specified in the source file, then the image name will be the name of the list file excluding any directory and file extension. Format for the image name declaration in the source (*.uc) and output (*.list) files is ".image_name name".

Address sharing between the microengine images and a core image is achieved by declaring variables as import variables using an import variable keyword in the microcode source file (*.uc) prior to the variables being used. The assembler generates a list of microword addresses and field bit positions within the microword where the variables are used and provides the information in its output file (*.list). Format for the import variable declaration in the assembler source (*.uc) file is ".import_var variable_name variable_name . . ."

The assembler process 118 assembles all of the code for a microcode image at one time. More specifically, it assembles all images sequentially with one build request. The .image_name and .import_var statements are processed as they are encountered. The assembler saves code locations at which the names indicated by the import_var statement are encountered.

Figure 6:
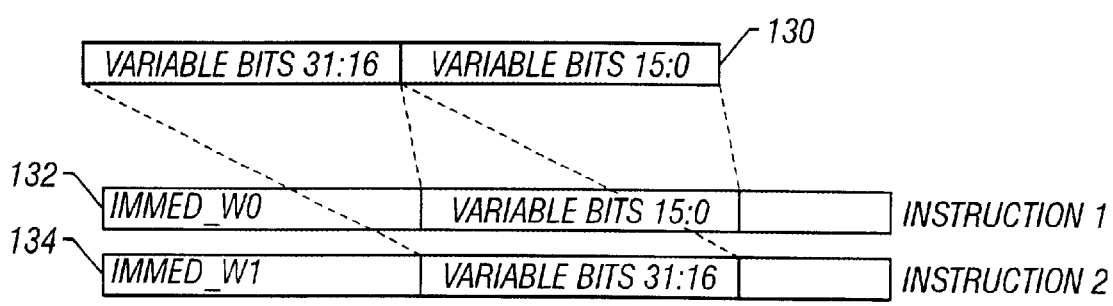
FIG. 6 is an illustration of an import variable being split between two different microcode instructions.

Referring to FIG. 6, an .import_var variable 130 can be split such that half of the variable is placed in first instruction 132, and the other half of the import variable is in a second instruction 134. To indicate which half of the variable goes to which of the instructions 132, 134, the following language syntax is used:

immed_w0[reg1, parameter1]//insert bits 31:16 immed_w1[reg1, parameter1>>16]//insert bits 15:0

Thus, the list file generated by the assembler 118 includes for a given image an image name, and for each import variable, instruction location(s), field size and bit location within the instruction(s). It also identifies which bits of the variable go to the instruction field.

Returning to FIG. 5, the linker process 120 accepts the list of microengine images generated by the assembler and combines the images into the single code object 116. The linker stores the code object in a microcode object file (*.uof file) or as a data buffer in memory in a format that is understood by the loader 66. Each of the images 120a–12f includes declaration and variable information 122a–122f, respectively, following by an instruction code 124a–124f. The declaration and variable information 122a–122f specifies image name, import variable names, import variable instruction locations, field size and shift amounts, as described earlier.

The code object 116 thus includes image objects 120a–120f for all processors in the multiprocessor configuration other than core processor, that is, the microengines 14b–14g. The code object 116 is loadable by the core image, running on the core processor 14a, utilizing library functions of the loader 66, as will be described in further detail.

Figure 7:
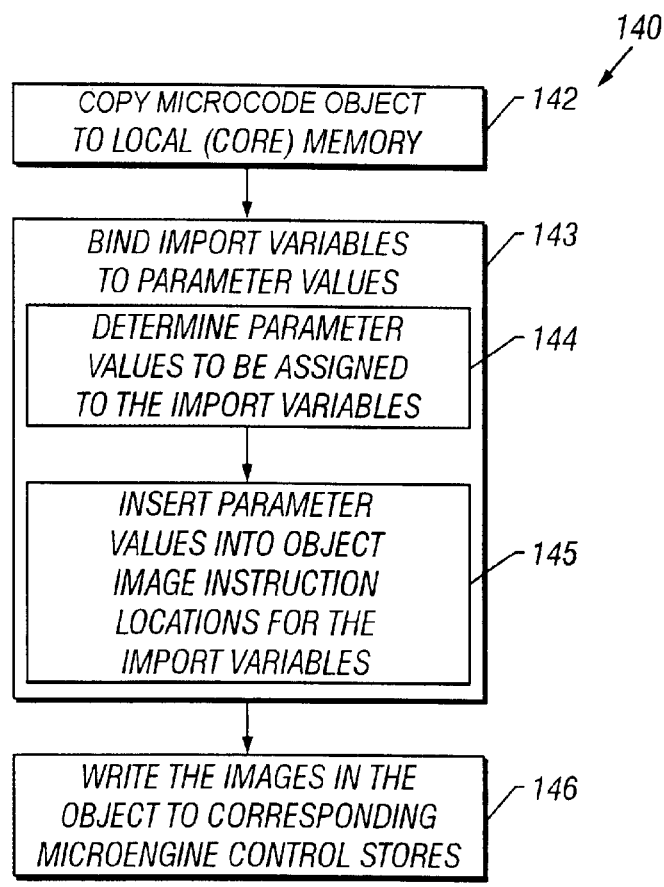
FIG. 7 is a flow diagram of a process of loading the microcode images (generated by the process of FIG. 5) into the microengines.

Referring to FIG. 7, an exemplary loading process 140 performed by the loader is as follows. The loader process 140, copies 142 the microcode object into local (core) memory. The loader process 140 binds 143 the import variables to parameter values by determining 144 the parameter values to be assigned to the import variables and inserting 145 the parameter values into the instruction code image at the instruction locations for the import variables (as specified by the import variable location, bit field and shift information). The loader process 140 writes 146 each of the images in the object to the corresponding microengine instruction code storage area (that is, the control stores 70).

The application can also use the loader to stop and start the microengines as needed to modify (for purposes of bug correction, code enhancements, functionality changes) the microcode in its entirety or a portion thereof. To modify an entire image for one or more of the microengines 14b–14g, a revised source code is provided as input to the development station, which generates a revised object file including the revised image or images, and the revised images are again loaded in the same manner as described with reference to FIG. 7. The only difference between the first load and subsequent loading of modified images is that the microengine to receive a modified engine must be placed in a paused or reset state prior to modified image being written to the microengine and then removed from the paused or reset state after the microcode image has been written to the designated control store.

Referring back to FIGS. 2–4, the application 60 places the microengine 14b in a paused or reset state by calling an appropriate function in the device drivers 64 (more specifically, in the microengine device driver). The development station tools 94 may include functions that the development station 90 can use to stop or reset the microengine. If the development station 90 performs this task, it notifies the application 60 that the microengine 14b is being placed in a paused or reset state.

In addition, as will be described, the application 60 can modify a portion of an image stored in one or more of the control stores 70. In one embodiment, the portion corresponds to a page.

Figure 8:
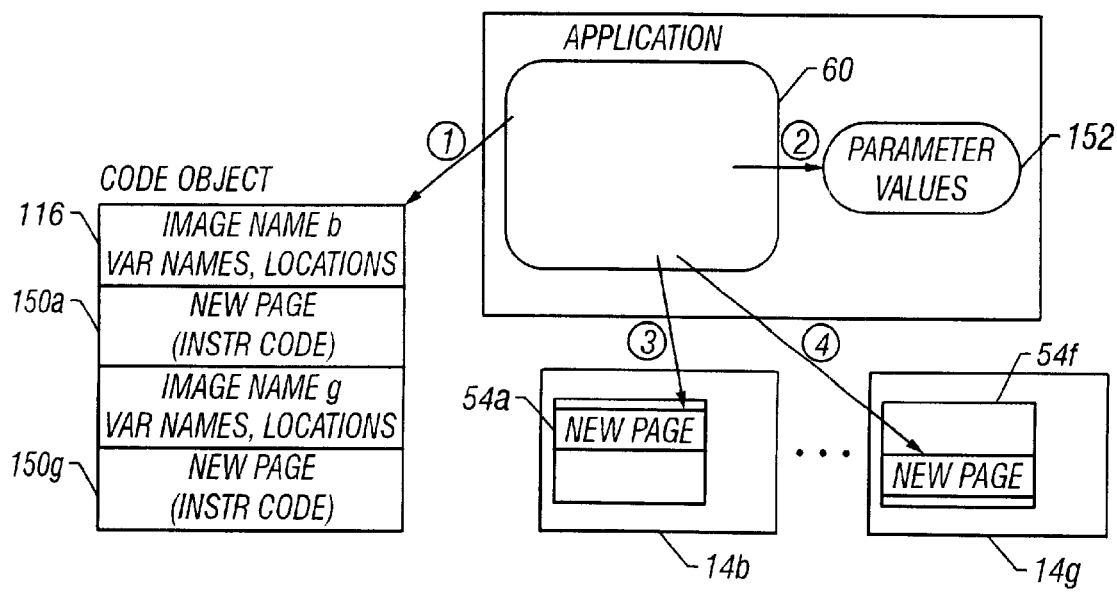
FIG. 8 is an illustration of a process of loading a page of a microcode image into the microengines (shown in FIG. 1).

To perform a modification on a single page basis, the microcode source code is further divided into pages. That is, the original source code identifies the start of a page with a .page declaration. As illustrated in FIG. 8, for a page modification, some code instructions in a page are modified at the source code file to produce new (that is, revised) pages 150a–150g. The new page is retrieved (from memory) by the application (indicated by arrow labeled "1"). The new page only may be updated with variable parameter values 152 during the binding process (indicated by arrow labeled "2") as previously described, and written to a location corresponding of the page in the image in the corresponding control stores 54 of the microengines (indicated by arrows "3" and "4").

As stated earlier, typically the core processor 14*a* is programmed to load each control store 70 upon system initialization. Preferably, it uses the microengine loader 66 to load microcode images generated by the microcode linker to the appropriate microengines, as described above with reference to FIG. 7. In the preferred embodiment, the loader 66 is a library of C functions that loads the program images from an object file into a control store, updates images with application parameter values and initializes the microengine registers.

Exemplary application programming interfaces (API) for the loader 66 are summarized in Table 1 below.

| API | Function |
| --- | --- |
| UcLo_InitLib | Initialize the loader library. |
| UcLo_LoadObjFile | Load microcode object from a file to core memory. |
| UcLo_CopyObjFile | Copy microcode object from a file to buffer. |
| UcLo_mapObjAddr | Maps core memory location to microcode object. |
| UcLo_DelObj | Removes all references to a microcode object. |
| UcLo_BindSymbol | Produces an association between a core application value and a microcode symbol. |
| UcLo_WriteUImageAll | Write all microcode images to the appropriate microengines. |
| UcLo_WriteUImage | Write a specific microcode image to its assigned microengine. |
| UcLo_WriteUImagePage | Writes a specified page of microcode image to an appropriate microengine. |
| UcLoPci_Init | Load microcode object via PCI bus. |

UcLO is a library of "C" functions that facilitate the loading of the microengine images, the management of the microengine variables and provides a communication link between the core application and the microengines.

The UcLo_InitLib function initializes the library and initialized microengine drivers. It is called by the core application prior to calling any of the other library functions. The library allocates and manages resources to accommodate the object. The application calls UcLo_deleObj to remove any reference to the object and free resources allocated by the library.

The UcLo_LoadObjFile function loads the object file produced by the linker into the core processor's memory. The UcLo_CopyObjFile loads the object from the object file to a buffer allocated by the library. The UcLo_MapObjAddr maps the memory location where the object file image resides to the object file. The UcLo_BindSymbol function associates a core application parameter value and a microcode import variable (or symbol). It initializes all occurrences of the specified import variable in the object file image to the 32-bit parameter value, or portion of the 32-bit value, as defined by the assembler. The UcLo_WriteUimageAll function writes all of the microcode images to the appropriate microengines. The UcLo_WriteUimagePage writes a page of microcode image that is specified by the ImageName parameter to the appropriate microengine(s) starting at address 0. The function specifies the page number to be loaded, along with the ImageName and handle (pointer reference to the loaded/mapped object). The UcLoPci_Init enables the loading of microcode object (*.uof) to the assigned microengines via the PCI channel using some type of communication mechanism, such as remote procedure call messages.

Figure 9:
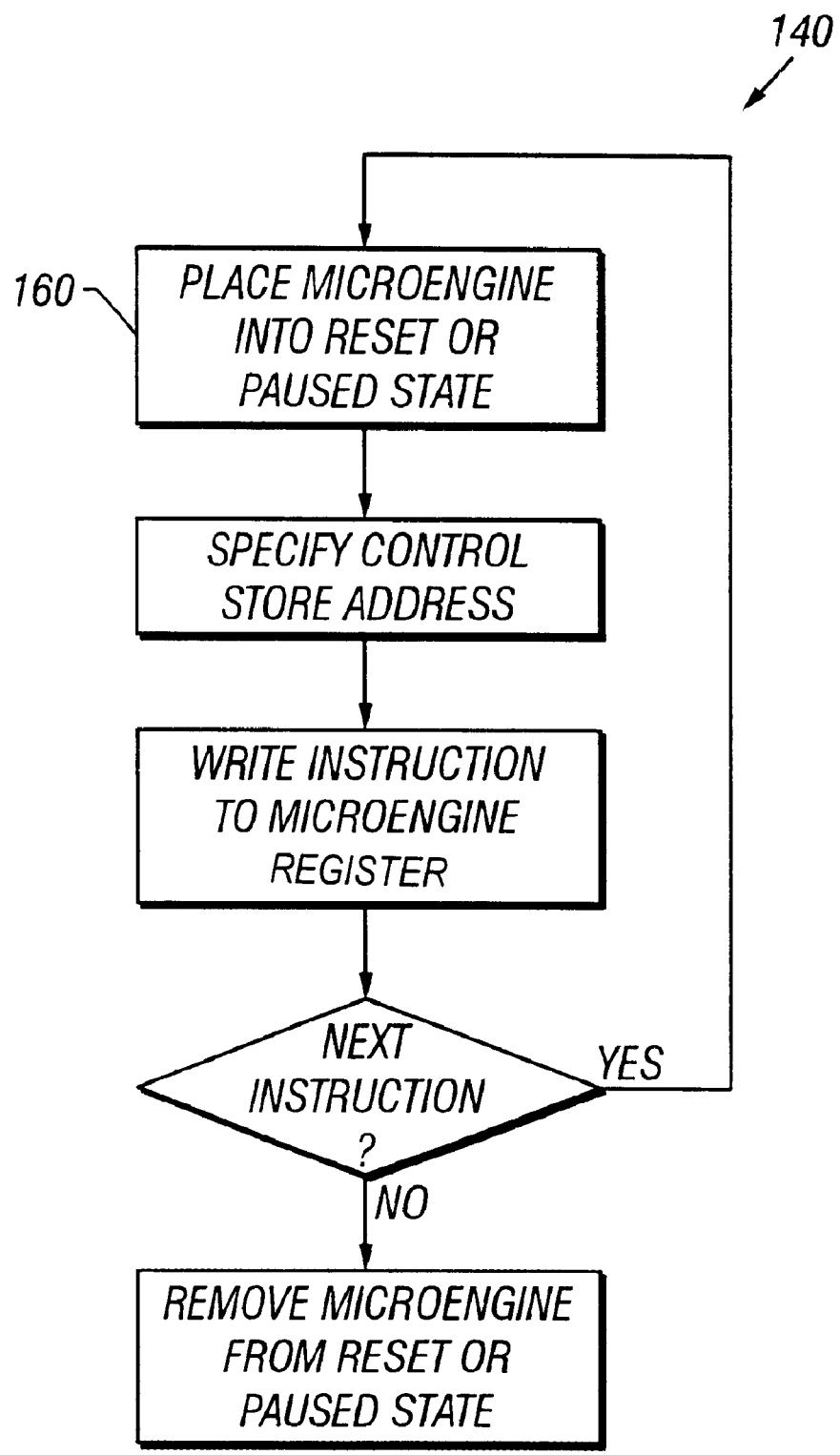
FIG. 9 is an alternative process of loading microcode images into the microengines.

Alternatively, and as shown in FIG. 9, the core processor application 60 can program the control stores 70 without using the loader 66 by performing a series of reads and writes to the control store 70. First, the core application 60 places 160 each microengine into a reset or paused state. It then writes 162 to a microcode store address register in the Read Transfer registers 80 (FIG. 3) (via the AMBA translator 44, from FIG. 1) with a control store address, making certain that the control store enable bit in the register is set. It then writes 164 an instruction to a microcode store data register in the Rd Transfer registers 80 (again, using the AMBA translator 44) to load the instruction into the control store. More specifically, once the address and instruction has been written to the appropriate registers, the microengine controller 72 (FIG. 3) transfers the instruction to the control store at the designated address. The core application then determines 166 if there is another instruction to be written. If so, the core application returns to 160 to repeat the instruction load for the next instruction. If there are no additional instructions to be loaded, the core application removes 166 the microengine from the reset or paused state.

Additions, subtractions, and other modifications of the preferred embodiments of the invention will be apparent to those practiced in this field and are within the scope of the following claims.

What is claimed is:

1. A method of executing an application by a processor in a multi-processor configuration of processors, each having an associated instruction memory, comprising:

receiving object code that includes an image for at least one other processor in the multi-processor configuration of processors;

binding an import variable in the image to a parameter value;

storing the image for the at least one other processor into the associated instruction memory; and modifying the image stored in the associated instruction memory wherein modifying comprises:

receiving revised object code including a revised version of the image and storing the revised image in the associated instruction memory.

2. The method of claim 1, wherein binding comprises:

inserting the parameter value into at least one instruction in the image.

3. The method of claim 1, further comprising:

calling a library function to insert the parameter value into the at least one instruction in the image.

4. The method of claim 1, wherein storing comprises:

calling a library function to load the image into the associated instruction memory.

5. The method of claim wherein modifying further comprises:

modifying a portion of the image.

6. The method of claim wherein the portion corresponds to a page.

7. The method of claim 1, wherein storing the revised image comprises:

using library functions to store the revised object code in a local memory, insert parameter values in instructions in the revised image and load the revised image with the newly inserted parameter values from the local memory into the associated instruction memory.

8. The method of claim 1, wherein modifying further comprises:

placing the processor into a paused state.

9. The method of claim 1, wherein the object code includes a parameter having a value that is included in fields of more than one instruction.

10. The method of claim 1, further comprising:

receiving object code that includes images for each of the other processors in the multi-processor configuration of processors; and storing the images for the other processors in each respective associated instruction memory.

11. The method of claim 1, wherein the images are identical for the other processors.

12. A processor comprising:

a multiprocessor configuration of processors;

an instruction memory in each of the processors; and a first one of the processors in the multiprocessor configuration of processors being operated to receiving object code that includes an image for at least one other processor in the multi-processor configuration of processors; to bind an import variable in the image to a parameter value; to store the image in the instruction memory of at least one other processor in the multi-processor configuration of processors while executing an application program image; and to modify the image stored in the associated instruction memory wherein modifying comprises:

to receive revised object code including a revised version of the image and to store the revised image in the associated instruction memory.

13. The processor of claim 12, wherein the first one of the processors is a general purpose processor, the code image corresponds to microcode and the at least one other processor is a microengine that executes the microcode.

14. An article comprising a computer-readable medium which stores computer-executable instructions for executing an application by a processor in a multi-processor configuration of processors, each having an associated instruction memory, the instructions causing a computer to:

receive object code that includes an image for at least one other processor in the multi-processor configuration of processors;

bind an import variable in the image to a parameter value;

store the image for the at least one other processor into the associated instruction memory; and modifying the image stored in the associated instruction memory wherein modifying comprises:

receiving revised object code including a revised version of the image and storing the revised image in the associated instruction memory.

15. The article of claim 14, wherein the image corresponds to microcode and the at least one other processor is a microengine that executes the microcode.

* * * * *